Oct. 24, 1944.  B. W. WHITE  2,361,074
TRACTION LIFT DEVICE
Filed April 5, 1943  3 Sheets-Sheet 1

INVENTOR
BURDEN WILLIAM WHITE
BY O.W. Lee
ATTORNEY

Oct. 24, 1944.  B. W. WHITE  2,361,074
TRACTION LIFT DEVICE
Filed April 5, 1943  3 Sheets-Sheet 2

INVENTOR
BURDEN WILLIAM WHITE
BY O.W.Lee
ATTORNEY

Oct. 24, 1944. B. W. WHITE 2,361,074
TRACTION LIFT DEVICE
Filed April 5, 1943 3 Sheets-Sheet 3

INVENTOR
BURDEN WILLIAM WHITE
BY O. W. Lee
ATTORNEY

Patented Oct. 24, 1944

2,361,074

UNITED STATES PATENT OFFICE 2,361,074

TRACTION LIFT DEVICE

Burden William White, Cheney, Wash., assignor to Cheney Weeder Company, Cheney, Wash., a corporation of Washington Application April 5, 1943, Serial No. 481,825

10 Claims. (Cl. 97—244)

The present invention relates to certain new and useful improvements in a traction lift device for that class of tillage implements which employ a castor wheel for supporting the rear end of an implement which is forwardly supported by two main wheels.

The invention provides radiating cams on the axle which is turned by the main wheels, and this power is transmitted to a reciprocating carriage which is slidably mounted upon the frame of the implement and transversely above the axle. These cams extend through a long slot in the reciprocating carriage and normally run idle. Manually operated means is provided to cause the rotating cams to move this reciprocating carriage forwardly upon the implement frame, and this movement is imparted to a lifting arm which coacts between the castor wheel and the implement frame so as to raise the latter to a position where the reciprocating carriage is engaged by a latch to hold the frame in its raised position with the cams turning idly. Means is provided to alter the range of lifting movement so as to operate at different depths of tillage.

The invention is so constructed that while the implement is traveling along, it can be repeatedly raised out of the soil and returned thereto, merely by jerk-rope operation from the tractor driver's seat, so as to provide one-man operation by the tractor driver without the necessity of stopping for raising and lowering the implement frame in the manner usually required.

The invention is particularly serviceable for the tillage of row crops where the turning radius is quite short at the ends of the rows and the implement must be raised to facilitate turning into the next row, and then lowered for operation in that row. For this purpose the invention saves much time and tractor fuel which would otherwise be wasted at the ends of the rows by stopping to manually raise and lower the implement by the usual hand lever operation of the castor wheel lift.

The invention is applicable to various kinds of tillage implements, and in the present instance it is illustrated as applied to a rotary rod weeder merely as one example of utilization.

The invention is not concerned with the type of tillage implement upon which it may be used, and for convenience of illustration, the drawings show it applied to rotary rod weeders which have long been well known to those skilled in this art, and therefore the rotary rod and its drive means need not be described here.

Figure 1:
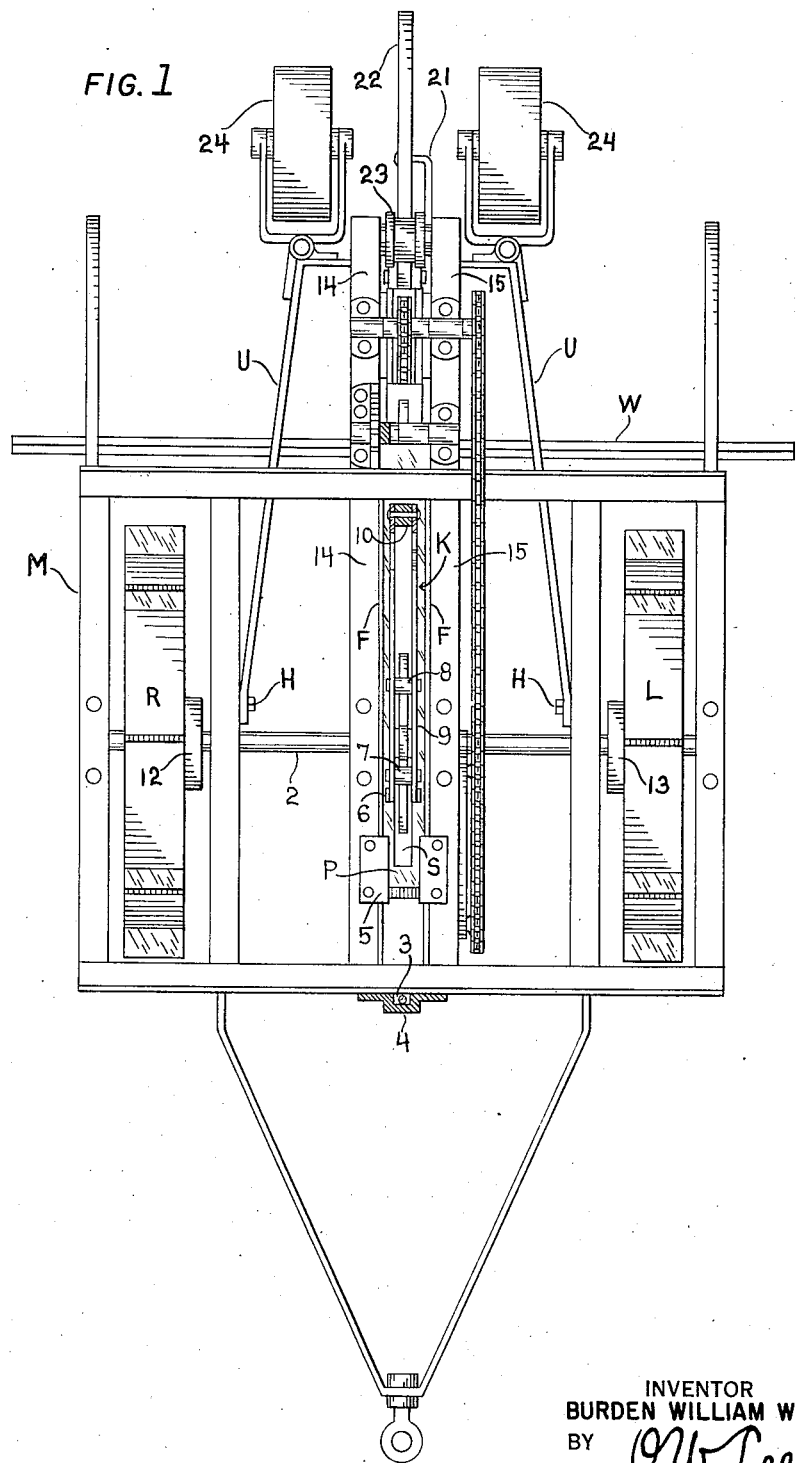
Fig. 1 is a plan view of the invention applied to a rotary rod weeder, parts being broken away for convenience of illustration.

Fig. 1 shows a narrow machine suitable for row crops. The main frame M is constructed in the usual well known manner and supported upon a pair of wheels L and R which preferably turn upon the axle 2 which is suitably journaled and turned in the forward direction only by providing each wheel with any suitable one-way clutch as indicated at 12 and 13. This is preferable as it enables short turns to be made without the lost motion which would otherwise be due to lag of the wheel on the inside of the turn if that was the wheel imparting the power to the axle. In some embodiments these two wheels can be on separate axles in the usual manner and the traction power derived from one of them by fixing it to the axle so as to eliminate the need of the aforesaid clutches.

Radiating cams A, B, C and D are fixed to the driven axle 2 so as to turn in a vertical plane centrally of the frame M. These cams extend up through the frame which is centrally provided with a pair of bars 14 and 15 which extend rearwardly of the frame in the usual manner so as to support the center standard V which houses the sprocket drive for the rotary rod W. Between these bars 14 and 15, there is slidably mounted a reciprocating carriage which is collectively indicated at K. Any suitable guide-ways may be provided for this carriage; as for instance, the carriage may be supported upon a number of rollers such as E and be held in contact therewith by guide rails such as F, each of the bars 14 and 15 having a series of rollers and a guide rail, so as to leave the central area clear for the rotating cams.

Figure 2:
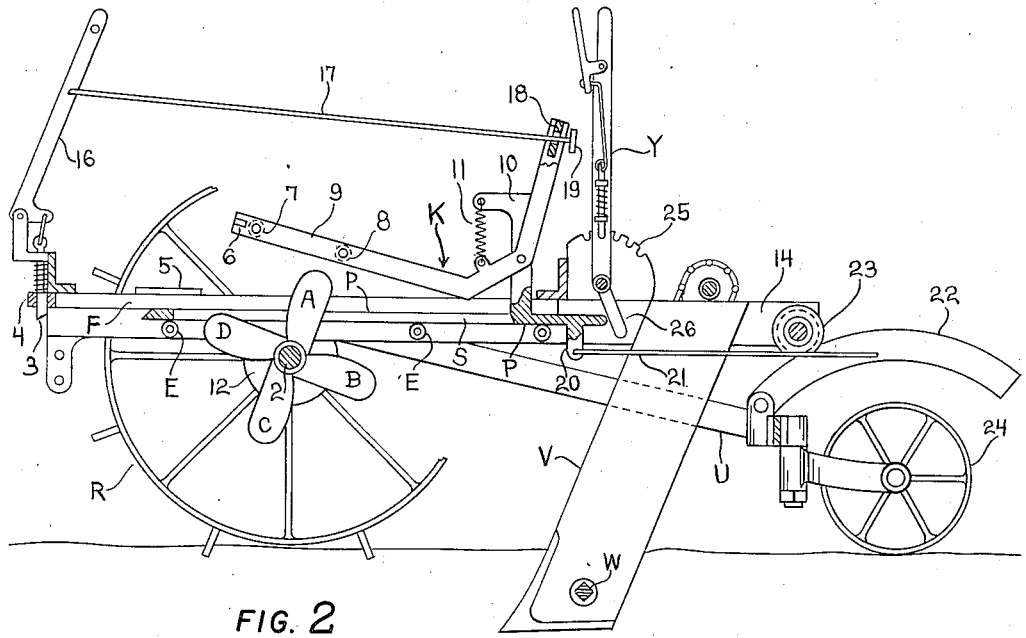
Fig. 2 is a central vertical section of Fig. 1.
Figure 5:
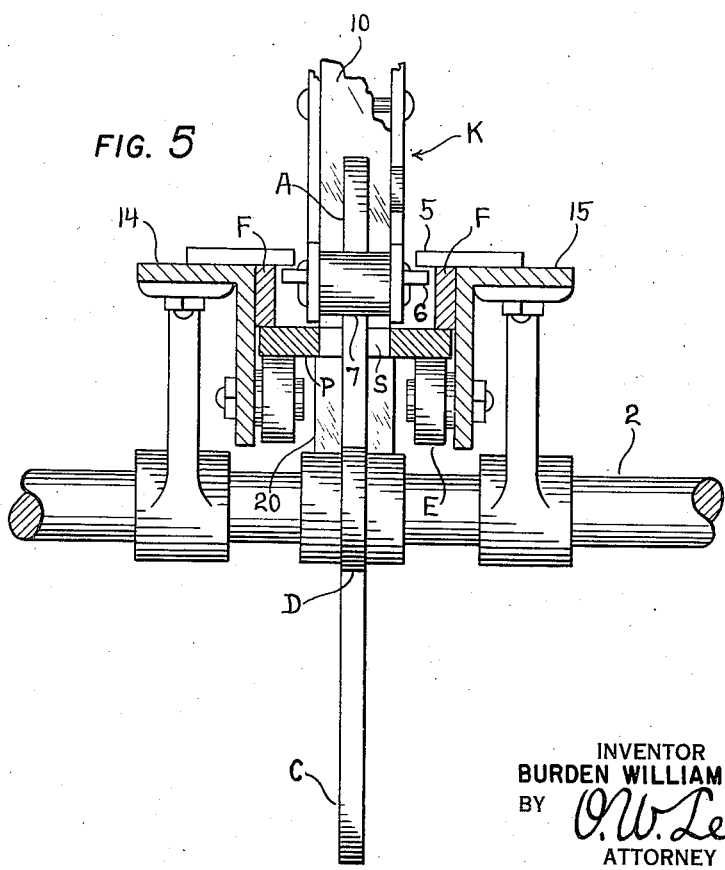
Fig. 5 is an enlarged fragmentary sectional view, taken on the line 5—5 of Fig. 4 and shows the cams operating through the longitudinal slot in the reciprocating carriage.

Referring to Figures 1, 2 and 5, this reciprocating carriage comprises a base plate P which is provided with a long longitudinal slot S through which the rotating cams run idle. Fixed to this base plate P, is an upright standard 10 upon which there is fulcrumed a cam engaging lever 9 which comprises a pair of arms secured together in spaced apart relation and having a pair of rollers 7 and 8 mounted therebetween for engagement with the aforesaid radial cams. As indicated at 11 in Fig. 2, this cam lever is spring lifted out of engagement with the rotating cams so that they can turn idle until this lever is manually urged down against the base plate P so that one of the rotating cams will engage the roller 7 and move the carriage forward in position for the succeeding cam to engage the roller 8 and move the carriage forward to its final forward position.

Figure 3:
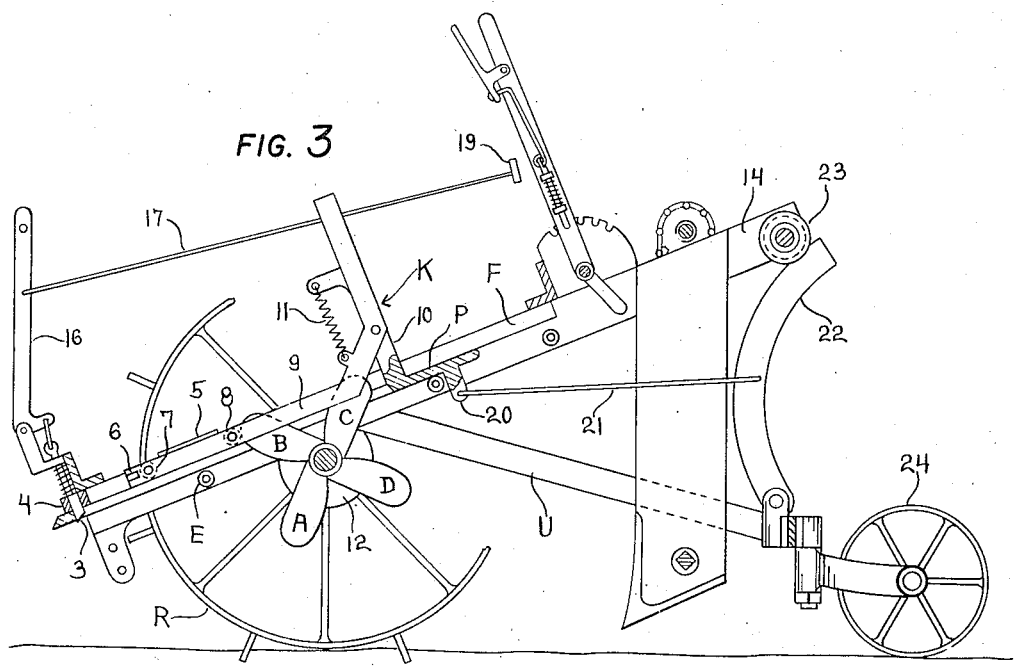
Fig. 3 shows the lifted position with the implement out of the soil.

To hold the carriage at its final forward position, a spring urged latch 3 is provided for engaging in the slot S which is of the proper length to reach the latch which is provided with a beveled strike face so that it is lifted when engaged by the front end of the base plate P which may also be beveled for that purpose. This latch 3 may be mounted in any suitable keeper 4 secured to the front of the main frame M. For manually disengaging this latch, it is provided with a lift lever 16 which can be operated by a jerk-rope from the tractor driver's seat, and preferably this lever 16 is connected to the upper end of the cam lever 9 by means of a slip rod 17 so that one jerk-rope will suffice for both levers. As shown in Fig. 2 this rod 17 is pivoted to the lever 16 and slidably mounted in a block 18 carried by the upper end of the cam lever 9, and a head or nut such as 19 is provided on the rear end of this rod. In the position shown in Fig. 2 a jerk-rope on the lever 16 will pull the cam lever 9 down to the operating position and it is a matter of no consequence that the latch 3 is also lifted. As the carriage travels forward, the slip rod 17 will slide through the cam lever as indicated in Fig. 3 so that the jerk-rope will then operate only the latch lever 16 and leave the cam lever subject to the action of the spring 11 as soon as the cam leaves the roller 8.

The roller 7 is situated sufficiently forward so that it comes into operative position slightly in advance of the vertical position of the cam which is to engage it. The pressure of the cam against the roller then holds the lever 9 down against the carriage while the cam moves the entire carriage forward, so as to bring the roller 8 into position to be engaged by the succeeding cam. The rollers 7 and 8 are spaced apart corresponding with their engagement with the rotating cams, so that the roller 8 becomes engaged by a cam at about the same time the preceding cam leaves the roller 7. To prevent the lever 9 from inadvertently rising, it is provided with laterally extending lugs 6, and keeper plates such as 5 are secured to the frame at an appropriate position so that the lugs 6 pass beneath these plates just before the roller 8 is engaged by the cam. These keeper plates 5 are of sufficient length to engage these lugs until the rotating cam moves the roller 8 past the vertical position of the cam, after which the lugs pass out from under the plates 5 and therefore the lever 9 is free to rise when the cam leaves the roller 8 which occurs at the forward position where the latch 3 engages the carriage to hold it until unlatched.

From this description, it will be seen that the carriage can be moved forward at will, by power derived from the traction wheels. A downwardly extending stump 20 is fixed to the rear of this reciprocating carriage, and the link 21 connects this stump to the arcuate lifting arm 22 which is hinged to the castor lifting wheel 24 if there be only one, or hinged to a bar connecting two of them if two are provided as indicated in Fig. 1. In either instance, a roller 23 is mounted between the rear ends of the bars 14 and 15, and this arcuate lifting arm 22 bears against that roller, which should be provided with a groove or else with flanges.

In the present instance, the castor wheels 24 are shown mounted on a frame U which is hinged to the main frame as indicated at H and H in Fig. 1; however, these castor wheels might equally well be slidably mounted in vertical guides in the manner well known in this art, or else mounted in various other modes which are in general use on machines of this type. In any such instances the operation would be essentially the same.

Figure 4:
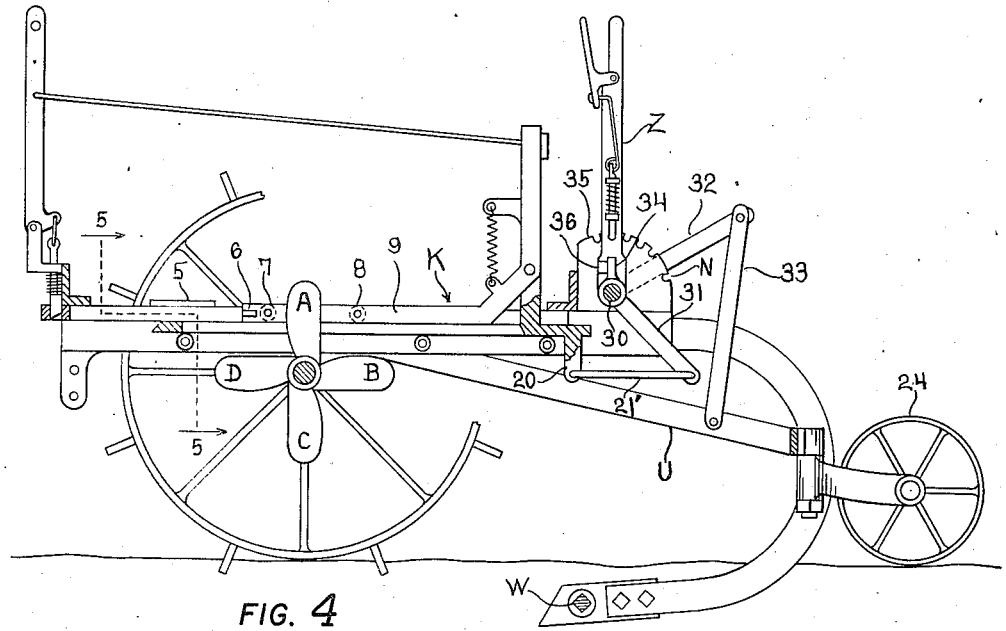
Fig. 4 shows the invention applied to a well known type of rockshaft lift.

Fig. 4 shows the invention applied to a well known type of rod weeder wherein the castor wheel lift is operated by a rockshaft having an arm and link connection to the frame of the castor wheel. As here shown the rockshaft 30 is provided with a crank arm 31 which is connected by a link 21' to the previously described stump 20 of the reciprocating carriage K. This rockshaft 30 is suitably journaled on the rear of the frame in the usual manner, and crank arms such as 32 are secured to the rockshaft, and a link such as 33 pivotally connects each crank arm 32 to the lift frame U, in the same manner that is well known general practice. These machines are usually twelve feet wide and therefore the rockshaft is usually provided with two sets of crank arms and links spaced apart according to the width of the lift frame U.

In contradistinction to the usual practice, the lever Z is free upon the rockshaft 30 so that the rockshaft can be operated by the present invention in the manner which has hereinbefore been made quite plain.

In order to enable the lever Z to be utilized for operating the machine at different depths below the surface of the soil, the rockshaft 30 has a spur 34 secured thereto and adjacent the lever Z which is provided with a lug 36 which bears against the spur 34. A notched latch plate 35 is provided for the latch lever Z and it will be seen that the reciprocating carriage K can be moved forward by moving the lever Z rearwardly, so as to cause the rotary rod to operate at a shallower depth, whereupon the traction lift of the present invention will then operate at that depth at each instance of use. The depth can be varied by engaging the lever Z at a selected one of the upper notches in the latch plate 35 which is also provided with a lower notch N for holding the machine out of the ground, so as to afford manual raising and lowering by the lever Z while the machine is standing still, as is sometimes required for emergencies or for repairs.

The latch plate 35 should have an unnotched area corresponding to the position at which the lugs 6 enter below the keeper plates 5, so as to preclude setting the lever Z at that point which is not within the range of operating conditions because it positions the rotary rod too high to engage the soil, and also because that position of the lever would objectionably cause the lugs 6 to collide with the keeper plates 5 and cause damage. Such a mishap is completely obviated by omitting the lever notches at that area of the latch plate.

Returning to Fig. 2, a latch lever Y is also provided to alter the range of operative movement. This lever is fulcrumed on its latch plate 25, and an arm 26 is provided on this lever or else on its fulcrum pin, and this arm 26 serves as a stop member to limit the rearward movement of the reciprocating carriage K so as to control the depth of operation in accordance with the setting of the lever Y. This lever does not have sufficient range to completely lift the machine out of the ground, as is possible with the previously described showing in Fig. 4.

From the two embodiments disclosed, it will be realized that the present invention is readily applicable to the various forms of castor wheel lift devices which are in general use, either on large machines for field use, or on narrow machines for row crops. The present invention is directed to the disclosed reciprocating carriage, irrespective of the mode of imparting its movement to lift the machine, and therefore the disclosed embodiments are intended only as examples, and not in a limiting sense.

The operation of the invention will be readily understood from the foregoing description, and it will be seen that the machine can be quickly raised or lowered while in constant movement. One jerk-rope operated from the tractor driver's seat fully suffices for both raising and lowering, and a skilled tractor driver can readily make turns at the end of row crops without even altering the driving speed of the tractor. Obviously, such turns are entirely too short to be accomplished without raising the implement out of the ground, and in the absence of the present invention much time and tractor fuel would be wasted by stopping twice upon entering and leaving each row.

For large field operation where one tractor pulls several twelve foot machines hitched in a gang, the several jerk-ropes can be suitably connected together so that all of the machines can be raised or lowered at the same time, as is of advantage where turns are made at the fenced corners of fields, and in places where water erosion has caused small trenches across the path of travel, and in various other instances where temporary travel without tillage, is made necessary by existing conditions.

In instances where the machine encounters underground hinderances such as the roots of wild rose bushes, it is a simple matter to back up sufficiently to free the machine, and then operate the jerk-rope to raise the machine so as to pass over the hinderance and then quickly lower it to the operating position.

In view of the fact that the machine can be raised completely out of the ground in about one-third of a turn of the wheels, the operation is quickly accomplished in a short space of travel, and the lowering can be accomplished as fast as the machine can enter the ground. Thus there is provided an efficiency fully adequate for all practical purposes in this art.

In weeding machines which operate quite near the surface of the soil and require a corresponding lesser amount of lift, it is possible to accomplish the purpose with only a single roller 7 on the lever arm 9, in which case the initial position of the roller should be such that it will be first engaged when the rotating cam arrives at the vertical position. In such instances, the lugs 6 and keeper plates 5 can be omitted, because the cam will hold the lever arm 9 down to position until the cam leaves the roller at the end of the stroke.

In the present disclosure, I claim as my invention:

1. In a tillage implement having a main frame forwardly fulcrumed on an axle turned by traction wheels and rearwardly supported by a castor wheel mounted for vertical movement relative to the main frame and including a lift lever cooperating between the castor wheel and the main frame, for lifting the latter; a longitudinally slotted reciprocating carriage slidably mounted on said main frame and transversely above said axle, radial cams fixed to said axle and turning idly through the slot in said carriage, an overhead lever fulcrumed on said carriage and disposed longitudinally thereof, rollers on said overhead lever for engaging said cams, a spring for holding said overhead lever free of said cams, and a link connecting said lift lever with said carriage so that the forward movement of the latter operates the former.

2. In a tillage implement having a main frame forwardly fulcrumed on an axle turned by traction wheels and rearwardly supported by a castor wheel mounted for vertical movement relative to the main frame and including a lift lever cooperating between the castor wheel and the main frame, for lifting the latter; a longitudinally slotted reciprocating carriage slidably mounted on said main frame and transversely above said axle, radial cams fixed to said axle and turning idly through the slot in said carriage, an overhead lever fulcrumed on said carriage and disposed longitudinally thereof, rollers on said overhead lever for engaging said cams, a spring for holding said overhead lever free of said cams, a link connecting said lift lever with said carriage so that the forward movement of the latter operates the former, a latch for holding said carriage at its forward position, and means for limiting the rearward movement of said carriage.

3. In a tillage implement having a main frame forwardly fulcrumed on an axle turned by traction wheels and rearwardly supported by a castor wheel mounted for vertical movement relative to the main frame and including a lift lever cooperating between the castor wheel and the main frame, for lifting the latter; a longitudinally slotted reciprocating carriage slidably mounted on said main frame and transversely above said axle, radial cams fixed to said axle and turning idly through the slot in said carriage, an overhead lever fulcrumed on said carriage and disposed longitudinally thereof, rollers on said overhead lever for engaging said cams, a spring for holding said overhead lever free of said cams, a link connecting said lift lever with said carriage so that the forward movement of the latter operates the former, a latch for holding said carriage at its forward position, means for manually raising said latch, a connection between said overhead lever and said latch raising means so that operation of the latter operates the former, and means for limiting the rearward movement of said carriage.

4. In a tillage implement having a main frame forwardly fulcrumed on an axle turned by traction wheels and rearwardly supported by a castor wheel mounted for vertical movement relative to the main frame, a roller journaled on the rear of the main frame, an arcuate lift lever cooperating between the castor wheel and said roller, a longitudinally slotted reciprocating carriage slidably mounted on said main frame and transversely above said axle, radial cams fixed to said axle and turning idly through the slot in said carriage, an overhead lever fulcrumed on said carriage and disposed longitudinally thereof, rollers on said overhead lever for engaging said cams, a spring for holding said overhead lever free of said cams, a link connecting said lift lever with said carriage so that the forward movement of the latter operates the former, a latch for holding said carriage at its forward position, means for manually raising said latch, a connection between said overhead lever and said latch raising means so that operation of the latter operates the former, and means for limiting the rearward movement of said carriage.

5. In a tillage implement having a main frame forwardly fulcrumed on an axle turned by traction wheels and rearwardly supported by a castor wheel mounted for vertical movement relative to the main frame, a roller journaled on the rear of the main frame, an arcuate lift lever cooperating between the castor wheel and said roller, a longitudinally slotted reciprocating carriage slidably mounted on said main frame and transversely above said axle, radial cams fixed to said axle and turning idly through the slot in said carriage, an overhead lever fulcrumed on said carriage and disposed longitudinally thereof, rollers on said overhead lever for engaging said cams, a spring for holding said overhead lever free of said cams, a link connecting said lift lever with said carriage so that the forward movement of the latter operates the former, a latch for holding said carriage at its forward position, and means for limiting the rearward movement of said carriage.

6. In a tillage implement having a main frame forwardly fulcrumed on an axle turned by traction wheels and rearwardly supported by a castor wheel mounted for vertical movement relative to the main frame, a roller journaled on the rear of the main frame, an arcuate lift lever cooperating between the castor wheel and said roller, a reciprocating carriage slidably mounted on said main frame and transversely above said axle, radial cams fixed to said axle, means to move said carriage forward by the action of said cams, means to operate said lift lever by the forward movement of said carriage, a latch for holding said carriage at its forward position, means for manually raising said latch, and means for limiting the rearward movement of said carriage.

7. In a tillage implement having a main frame forwardly fulcrumed on an axle turned by traction wheels and rearwardly supported by a castor wheel mounted for vertical movement relative to the main frame and including a lift lever cooperating between the castor wheel and the main frame, for lifting the latter; a reciprocating carriage slidably mounted on said main frame and transversely above said axle, radial cams fixed to said axle, means to move said carriage forward by the action of said cams, and means to operate said lift lever by the forward movement of said carriage.

8. In a tillage implement having a main frame forwardly fulcrumed on an axle turned by traction wheels and rearwardly supported by a castor wheel mounted for vertical movement relative to the main frame and including a lift lever cooperating between the castor wheel and the main frame, for lifting the latter; a reciprocating carriage slidably mounted on said main frame and transversely above said axle, radial cams fixed to said axle, means to move said carriage forward by the action of said cams, means to operate said lift lever by the forward movement of said carriage, a latch for holding said carriage at its forward position, means for manually raising said latch, and means for limiting the rearward movement of said carriage.

9. In a tillage implement having a main frame forwardly fulcrumed on an axle turned by traction wheels and rearwardly supported by a castor wheel mounted for vertical movement relative to the main frame and having a rock shaft with an operative connection to the castor wheel so as to lift the main frame; a reciprocating carriage slidably mounted on said main frame and transversely above said axle, radial cams fixed to said axle, means to move said carriage forward by the action of said cams, and means to operate said rock shaft by the forward movement of said carriage.

10. In a tillage implement having a main frame forwardly fulcrumed on an axle turned by traction wheels and rearwardly supported by a castor wheel mounted for vertical movement relative to the main frame and having a rock shaft with an operative connection to the castor wheel so as to lift the main frame; a reciprocating carriage slidably mounted on said main frame and transversely above said axle, radial cams fixed to said axle, means to move said carriage forward by the action of said cams, means to operate said rock shaft by the forward movement of said carriage, a latch for holding said carriage at its forward position, means for manually raising said latch, and means for limiting the rearward movement of said carriage.

BURDEN WILLIAM WHITE.